US012739155B1

(12) United States Patent
Sun

(10) Patent No.: US 12,739,155 B1

(45) Date of Patent: Sep. 15, 2026

(54) ON-CHIP VIRTUAL NETWORK ANALYZER, METHOD, COMPUTER DEVICE, AND STORAGE MEDIUM

(71) Applicant: PHOTONIC TECHNOLOGIES (SHANGHAI) CO., LTD., Shanghai (CN)

(72) Inventor: Quanhui Sun, Shanghai (CN)

(73) Assignee: PHOTONIC TECHNOLOGIES (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 19/209,611

(22) Filed: May 15, 2025

(30) Foreign Application Priority Data

Mar. 11, 2025 (CN) ........................ 202510279028.1

(51) Int. Cl.
*H04L 25/03* (2006.01)

(52) U.S. Cl.
CPC .. *H04L 25/03885* (2013.01); *H04L 25/03019* (2013.01)

(58) Field of Classification Search
CPC .................... H04L 25/03885; H04L 25/03019
See application file for complete search history.

(56) References Cited

U.S. PATENT DOCUMENTS

| | | | | |
|---|---|---|---|---|
| 5,524,281 | A * | 6/1996 | Bradley | G01R 27/28 455/67.15 |
| 5,999,568 | A | 12/1999 | Yiu | |
| 6,188,721 | B1 * | 2/2001 | Shirani | H04L 25/03885 375/232 |
| 2004/0005001 | A1 | 1/2004 | Jones et al. | |
| 2017/0047844 | A1 * | 2/2017 | Hayami | H02M 3/156 |

FOREIGN PATENT DOCUMENTS

| | | | |
|---|---|---|---|
| CN | 101310495 | A | 11/2008 |
| CN | 110636020 | A | 12/2019 |
| CN | 111510404 | A | 8/2020 |
| CN | 115499024 | A | 12/2022 |

* cited by examiner

*Primary Examiner* — Sam K Ahn
*Assistant Examiner* — Amneet Singh
(74) *Attorney, Agent, or Firm* — Rankin, Hill & Clark LLP

(57) ABSTRACT

An on-chip virtual network analyzer establishes the loss model of the first channel in the training mode, and uses the loss model of the first channel in the operating mode, based on the frequency of the input signal and the waveform peak of the output signal detected by the peak detector, adjusts the adjustable equalization gain, such that the amplitude of the output signal is consistent with the amplitude of the input signal.

17 Claims, 5 Drawing Sheets on-chip virtual network analyzer 200
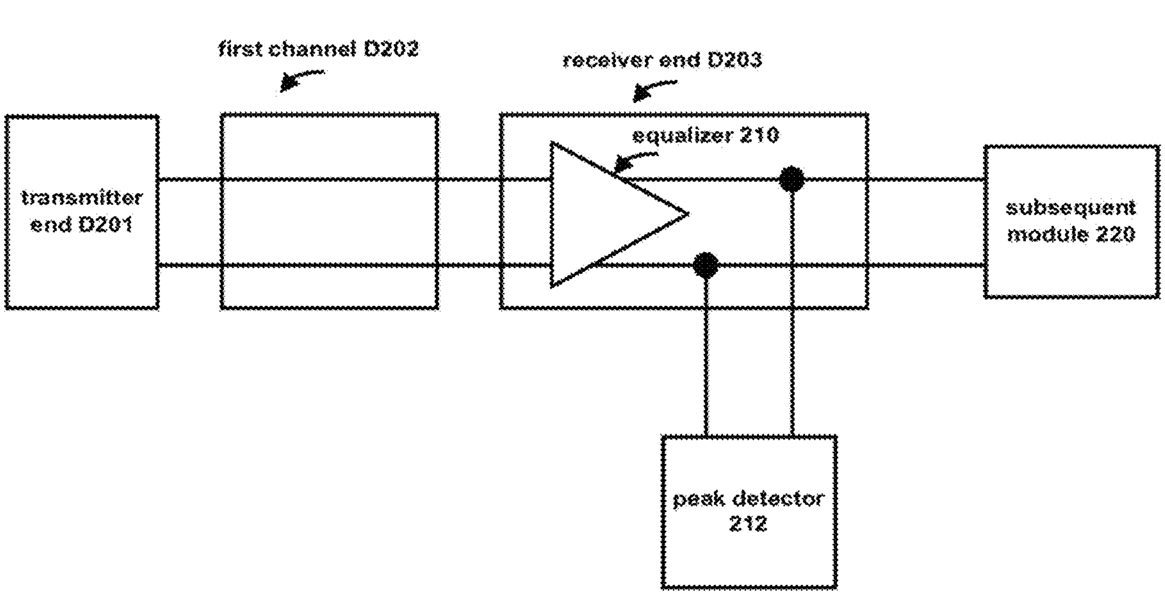
FIG.2

S301 providing an equalizer of an on-chip virtual network analyzer, the equalizer being deployed at a receiver end of a first channel, the equalizer being configured for modulating an intermediate signal according to an adjustable equalization gain so as to obtain an output signal, the intermediate signal being obtained by the transmission of an input signal through the first channel

S303 providing a peak detector of the on-chip virtual network analyzer, the peak detector being deployed at the receiver end, the peak detector being configured for detecting a waveform peak of the output signal

FIG.3

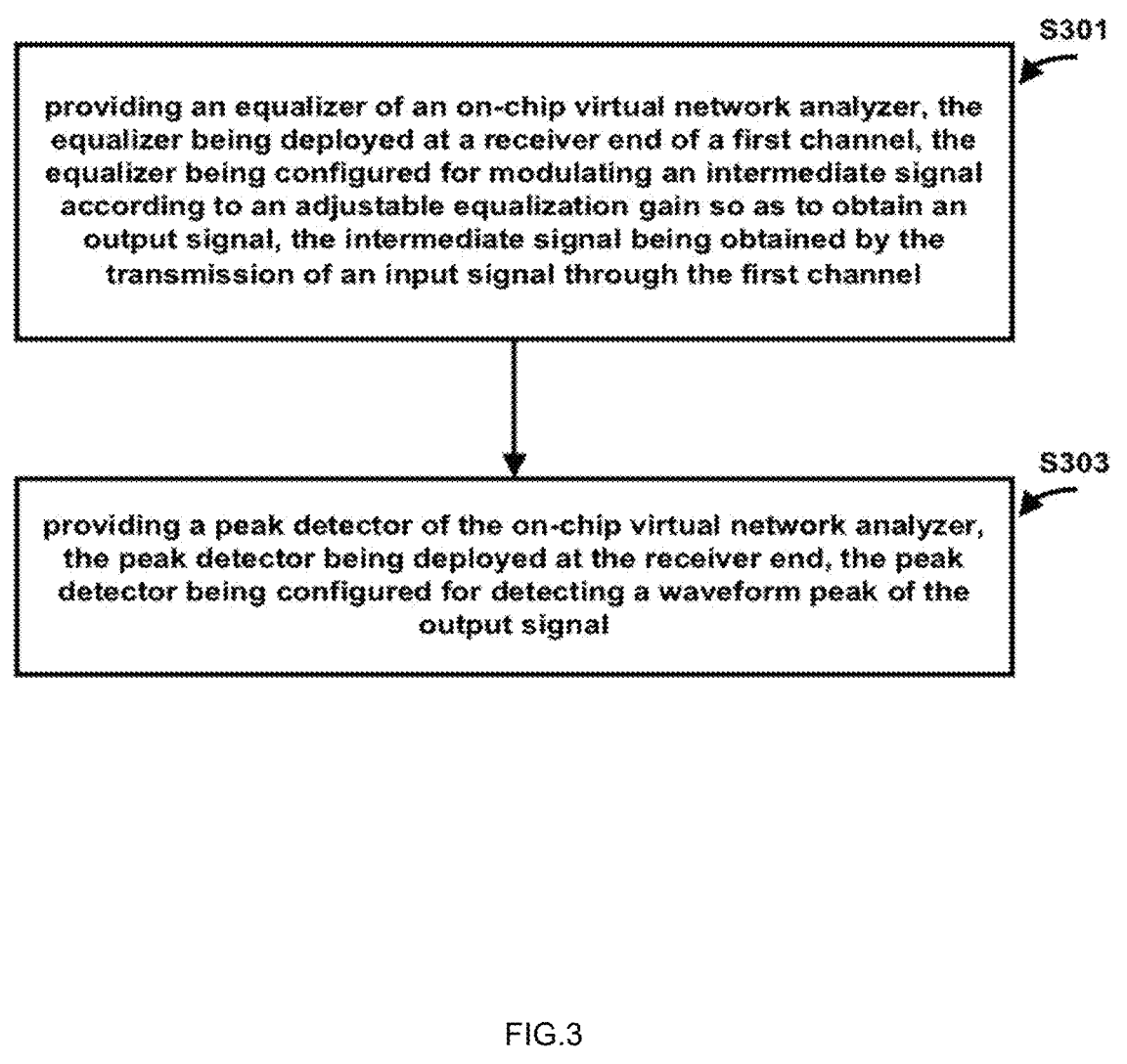

ON-CHIP VIRTUAL NETWORK ANALYZER, METHOD, COMPUTER DEVICE, AND STORAGE MEDIUM

CROSS-REFERENCE TO RELATED APPLICATIONS

The present application claims priority to Chinese patent application Ser. No. CN2025102790281, filed on Mar. 11, 2025, which has published as CN119788471A on Apr. 8, 2025, the contents of which are incorporated by reference in their entirety.

FIELD OF THE INVENTION

The present disclosure relates to the field of signal processing. More specifically, the present disclosure relates to techniques for an on-chip virtual network analyzer, method, computer device, and storage medium.

BACKGROUND OF THE INVENTION

In implementations such as data centers, high-performance computers, and high-speed digital communications, data transmission and data processing between different nodes and different machines are involved, such as analog-to-digital conversion (ADC) and digital-to-analog conversion (DAC), so it may be necessary to amplify or attenuate the signal frequently to match the differences between the pre-stage circuit and the post-stage circuit. For example, a variable gain amplifier (VGA) or its subclass programmable gain amplifier (PGA) is deployed on a subsequent module of a digital to analog converter to amplify or attenuate the voltage level of the voltage signal within the dynamic signal range. However, the conventional techniques rely on VGA and PGA to amplify or attenuate the signal, which does not fully take into account the differences between different channels in multi-channel scenarios, and generally applies modulation according to a preset gain, such as the same gain. However, in implementations such as data centers and high-performance servers, the data channel used to transmit signals, such as the cable connecting two servers, is fixed after installation, making it difficult to inspect directly by disassembling it after installation. These channels are affected by aging and device loss during use, resulting in an increase in the differences between the channel loss performances of these channels, and a greater deviation from the situation at the time of installation, therefore, if the channel loss compensation for these channels is continued according to the preset gain, it may lead to inconsistent signal amplitudes at the receiver end, which is not conducive to improving the overall system performance.

In light of above, the present disclosure provides an on-chip virtual network analyzer, method, computer device, and storage medium, in order to solve the technical problems in the art.

SUMMARY OF THE INVENTION

In accordance with a first aspect of the present disclosure, an on-chip virtual network analyzer is provided. The on-chip virtual network analyzer includes an equalizer. The equalizer is deployed at a receiver end of a first channel, and is configured for modulating an intermediate signal according to an adjustable equalization gain so as to obtain an output signal. The intermediate signal is obtained by the transmission of an input signal through the first channel. The on-chip virtual network analyzer also includes a peak detector. The peak detector is deployed at the receiver end, and is configured for detecting a waveform peak of the output signal. The on-chip virtual network analyzer is configured for establishing a loss model of the first channel in a training mode. The loss model of the first channel indicates losses of a plurality of signals of different frequencies with a fixed amplitude transmitted through the first channel respectively, and, the equalizer in the training mode does not modulate. The on-chip virtual network analyzer is configured for, in an operating mode, in accordance with the loss model of the first channel, based on a frequency of the input signal and the waveform peak of the output signal detected by the peak detector, adjusting the adjustable equalization gain, such that an amplitude of the output signal is consistent with an amplitude of the input signal.

With reference to the first aspect of the present disclosure, the on-chip virtual network analyzer establishes the loss model of the first channel in the training mode, and uses the loss model of the first channel in the operating mode, based on the frequency of the input signal and the waveform peak of the output signal detected by the peak detector, adjusts the adjustable equalization gain, such that the amplitude of the output signal is consistent with the amplitude of the input signal. The on-chip virtual network analyzer not only takes into account the channel loss performance caused by the first channel, but also takes into account the influence caused by the devices and circuitry of the equalizer itself. The on-chip virtual network analyzer, in the operating mode, utilizes the cooperation of the equalizer and the peak detector, and uses the loss model of the first channel to determine the scanning result corresponding to the frequency of the current input signal, so as to determine the channel loss performance of the first channel at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. It enables accurate and reliable judgment on how to perform channel loss compensation and how to amplify or attenuate the signal to meet the needs of subsequent modules, which is conducive to improving the overall performance of the system.

In accordance with the first aspect of the present disclosure, in a manner of implementation, the equalizer in the operating mode modulates the intermediate signal according to the adjustable equalization gain after adjustment so as to obtain the output signal.

In accordance with the first aspect of the present disclosure, in a manner of implementation, the adjustable equalization gain in the training mode is fixed to 1.0.

In accordance with the first aspect of the present disclosure, in a manner of implementation, the loss model of the first channel indicates amplitudes of a plurality of intermediate signals obtained by the transmission of the plurality of signals of different frequencies with the same fixed amplitude through the first channel respectively.

In accordance with the first aspect of the present disclosure, in a manner of implementation, the peak detector in the training mode is configured for providing a frequency sweep function for determining a S21 parameter of a system including the first channel and the on-chip virtual network analyzer. The S21 parameter is a gain-to-bandwidth change curve.

In accordance with the first aspect of the present disclosure, in a manner of implementation, the equalizer and the peak detector in the operating mode together form a negative feedback loop for providing a swing control function.

In accordance with the first aspect of the present disclosure, in a manner of implementation, the input signal and the output signal are both electrical signals. An on-chip oscilloscope is deployed at the receiver end for performing waveform analyzing to the output signal to obtain a waveform analysis result, and, the waveform analysis result is used for improving the performance of the on-chip virtual network analyzer.

In accordance with the first aspect of the present disclosure, in a manner of implementation, the input signal and the output signal are both optical signals. A photo-diode and an on-chip oscilloscope are deployed at the receiver end. The photo-diode is used for converting the output signal into an electrical signal corresponding to the output signal. The on-chip oscilloscope is used for performing waveform analyzing to the electrical signal corresponding to the output signal to obtain a waveform analysis result, and, the waveform analysis result is used for improving the performance of the on-chip virtual network analyzer.

In accordance with the first aspect of the present disclosure, in a manner of implementation, the first channel belongs to a plurality of channels. A respective on-chip virtual network analyzer is deployed at a receiver end of each channel of the plurality of channels. The respective on-chip virtual network analyzer corresponding to each channel of the plurality of channels is configured for, in the training mode establishing a respective loss model of each channel of the plurality of channels, and, in the operating mode using the respective loss model of each channel of the plurality of channels to adjust an adjustable equalization gain of an equalizer of the respective on-chip virtual network analyzer corresponding to each channel of the plurality of channels.

In accordance with the first aspect of the present disclosure, in a manner of implementation, the plurality of channels correspond to a plurality of connecting cables on a same panel. A respective round-trip loss of each connecting cable of the plurality of connecting cables is determined base on a respective position of each connecting cable of the connecting cables on the panel and a respective length of each connecting cable of the connecting cables.

In accordance with a second aspect of the present disclosure, a method for on-chip virtual network analyzing is provided. The method includes: providing an equalizer of an on-chip virtual network analyzer, and, providing a peak detector of the on-chip virtual network analyzer. The equalizer is deployed at a receiver end of a first channel. The equalizer is configured for modulating an intermediate signal according to an adjustable equalization gain so as to obtain an output signal. The intermediate signal is obtained by the transmission of an input signal through the first channel. The peak detector is deployed at the receiver end. The peak detector is configured for detecting a waveform peak of the output signal. The on-chip virtual network analyzer is configured for establishing a loss model of the first channel in a training mode. The loss model of the first channel indicates losses of a plurality of signals of different frequencies with a fixed amplitude transmitted through the first channel respectively, and, the equalizer in the training mode does not modulate. The on-chip virtual network analyzer is configured for, in an operating mode, in accordance with the loss model of the first channel, based on a frequency of the input signal and the waveform peak of the output signal detected by the peak detector, adjusting the adjustable equalization gain, such that an amplitude of the output signal is consistent with an amplitude of the input signal.

With reference to the second aspect of the present disclosure, the on-chip virtual network analyzer establishes the loss model of the first channel in the training mode, and uses the loss model of the first channel in the operating mode, based on the frequency of the input signal and the waveform peak of the output signal detected by the peak detector, adjusts the adjustable equalization gain, such that the amplitude of the output signal is consistent with the amplitude of the input signal. The on-chip virtual network analyzer not only takes into account the channel loss performance caused by the first channel, but also takes into account the influence caused by the devices and circuitry of the equalizer itself. The on-chip virtual network analyzer, in the operating mode, utilizes the cooperation of the equalizer and the peak detector, and uses the loss model of the first channel to determine the scanning result corresponding to the frequency of the current input signal, so as to determine the channel loss performance of the first channel at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. It enables accurate and reliable judgment on how to perform channel loss compensation and how to amplify or attenuate the signal to meet the needs of subsequent modules, which is conducive to improving the overall performance of the system.

In accordance with the second aspect of the present disclosure, in a manner of implementation, the loss model of the first channel indicates amplitudes of a plurality of intermediate signals obtained by the transmission of the plurality of signals of different frequencies with the same fixed amplitude through the first channel respectively.

In accordance with the second aspect of the present disclosure, in a manner of implementation, the peak detector in the training mode is configured for providing a frequency sweep function for determining a S21 parameter of a system including the first channel and the on-chip virtual network analyzer. The S21 parameter is a gain-to-bandwidth change curve.

In accordance with the second aspect of the present disclosure, in a manner of implementation, the equalizer and the peak detector in the operating mode together form a negative feedback loop for providing a swing control function.

In accordance with the second aspect of the present disclosure, in a manner of implementation, the first channel belongs to a plurality of channels. A respective on-chip virtual network analyzer is deployed at a receiver end of each channel of the plurality of channels. The respective on-chip virtual network analyzer corresponding to each channel of the plurality of channels is configured for, in the training mode establishing a respective loss model of each channel of the plurality of channels, and, in the operating mode using the respective loss model of each channel of the plurality of channels to adjust an adjustable equalization gain of an equalizer of the respective on-chip virtual network analyzer corresponding to each channel of the plurality of channels.

In accordance with the second aspect of the present disclosure, in a manner of implementation, the plurality of channels correspond to a plurality of connecting cables on a same panel. A respective round-trip loss of each connecting cable of the plurality of connecting cables is determined base on a respective position of each connecting cable of the connecting cables on the panel and a respective length of each connecting cable of the connecting cables.

In accordance with the second aspect of the present disclosure, in a manner of implementation, the equalizer in the operating mode modulates the intermediate signal according to the adjustable equalization gain after adjustment so as to obtain the output signal.

In accordance with the second aspect of the present disclosure, in a manner of implementation, the input signal and the output signal are both electrical signals. An on-chip oscilloscope is deployed at the receiver end for performing waveform analyzing to the output signal to obtain a waveform analysis result, and, the waveform analysis result is used for improving the performance of the on-chip virtual network analyzer.

In accordance with the second aspect of the present disclosure, in a manner of implementation, the input signal and the output signal are both optical signals. A photo-diode and an on-chip oscilloscope are deployed at the receiver end. The photo-diode is used for converting the output signal into an electrical signal corresponding to the output signal, the on-chip oscilloscope is used for performing waveform analyzing to the electrical signal corresponding to the output signal to obtain a waveform analysis result, and, the waveform analysis result is used for improving the performance of the on-chip virtual network analyzer.

In accordance with a third aspect of the present disclosure, a computer device is provided. The computer device includes: one or more computer processors; and one or more computer-readable storage media having instructions stored thereon that, responsive to execution by the one or more computer processors, perform operations. The operations include: providing an equalizer of an on-chip virtual network analyzer, and, providing a peak detector of the on-chip virtual network analyzer. The equalizer is deployed at a receiver end of a first channel. The equalizer is configured for modulating an intermediate signal according to an adjustable equalization gain so as to obtain an output signal. The intermediate signal is obtained by the transmission of an input signal through the first channel. The peak detector is deployed at the receiver end. The peak detector is configured for detecting a waveform peak of the output signal. The on-chip virtual network analyzer is configured for establishing a loss model of the first channel in a training mode. The loss model of the first channel indicates losses of a plurality of signals of different frequencies with a fixed amplitude transmitted through the first channel respectively, and, the equalizer in the training mode does not modulate. The on-chip virtual network analyzer is configured for, in an operating mode, in accordance with the loss model of the first channel, based on a frequency of the input signal and the waveform peak of the output signal detected by the peak detector, adjusting the adjustable equalization gain, such that an amplitude of the output signal is consistent with an amplitude of the input signal.

With reference to the third aspect of the present disclosure, the on-chip virtual network analyzer establishes the loss model of the first channel in the training mode, and uses the loss model of the first channel in the operating mode, based on the frequency of the input signal and the waveform peak of the output signal detected by the peak detector, adjusts the adjustable equalization gain, such that the amplitude of the output signal is consistent with the amplitude of the input signal. The on-chip virtual network analyzer not only takes into account the channel loss performance caused by the first channel, but also takes into account the influence caused by the devices and circuitry of the equalizer itself. The on-chip virtual network analyzer, in the operating mode, utilizes the cooperation of the equalizer and the peak detector, and uses the loss model of the first channel to determine the scanning result corresponding to the frequency of the current input signal, so as to determine the channel loss performance of the first channel at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. It enables accurate and reliable judgment on how to perform channel loss compensation and how to amplify or attenuate the signal to meet the needs of subsequent modules, which is conducive to improving the overall performance of the system.

BRIEF DESCRIPTION OF THE DRAWINGS

The drawings are provided to illustrate example embodiments described herein and are not intended to limit the scope of the present disclosure.

FIG. 2 is a schematic diagram illustrating an example on-chip virtual network analyzer according to some embodiments.

FIG. 3 is a flow chart illustrating a method for on-chip virtual network analyzing according to some embodiments.

DETAILED DESCRIPTION

Aspects and embodiments of the present invention will now be discussed with reference to the accompanying figures. Further aspects and embodiments will be apparent to those skilled in the art. All documents mentioned in this text are incorporated herein by reference.

Figure 1:
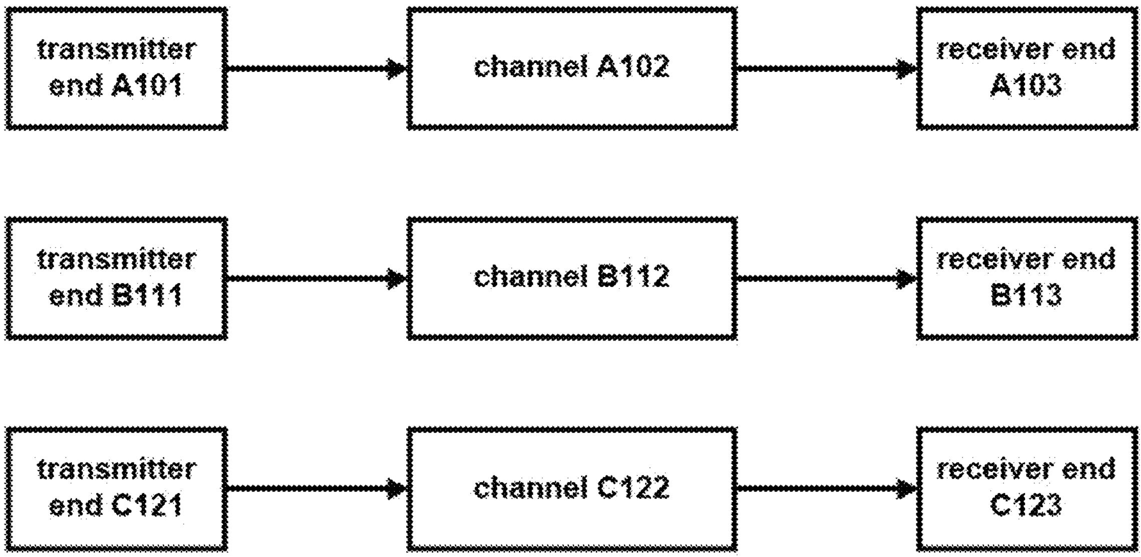
FIG. 1 FIG. 1 is a schematic diagram illustrating a multi-channel implementation scenario.

FIG. 1 is a schematic diagram illustrating a multi-channel implementation scenario. As depicted by FIG. 1, multiple transmitter ends by means of multiple channels transmit data to multiple receiver ends. Specifically, a transmitter end A101 by means of a channel A102 transmits data to a receiver end A103, a transmitter end B111 by means of a channel B112 transmits data to a receiver end B113, and, a transmitter end C121 by means of a channel C122 transmits data to a receiver end C123. In implementation scenarios such as data centers, high performance computers, and high speed digital communications, data transmission and data processing across different nodes or different machines are involved, such as analog-to-digital conversion and digital-to-analog conversion, therefore, signals may need to be frequently amplified or attenuated so as to match the differences between pre-stage circuits and post-stage circuits. For example, a variable gain amplifier or a programmable gain amplifier of its sub-category may be deployed in a subsequent module with respect to a digital-to-analog converter, which are configured for adjusting the voltage level of a voltage signal within the dynamic signal range to amplify or attenuate the signal. Taking the multi-channel implementation scenario of FIG. 1 for example, in a multi-channel scenario, there may be differences in channel loss between different channels, and signals of the same frequency may have different degrees of loss as the signals are transmitted through different channels. For example, a signal with an amplitude of 1 volt and a frequency of 1 gigahertz (GHz), after transmission through channel A102, may become a signal with an amplitude of 0.8 volts, while, this signal, after transmission through channel B112, may become a signal with an amplitude of 0.5 volts. In order for the channel loss compensation, and to meet the adaptation between the pre-stage circuits and post-stage circuits, the signal transmitted through the channel is generally amplified or attenuated. However, if multiple channels are modulated according to the preset gain, the preset gain may not be able to cope with the current state of each channel as the channel loss performance of these channels differs because these channels are affected by aging and device loss during use. For example, there may be a large difference in channel loss performance between channel A102 and channel B112, and the deviation may be significant compared to the situation at the time of installation. On the other hand, in implementations such as data centers and high-performance servers, the data channel used to transmit signals, such as the cable connecting the two servers, is fixed after installation, making it difficult to inspect directly by disassembling after installation. Therefore, when a signal is sent through multiple channels, such as sending a signal to the receiver end A103 by the transmitter end A101 and sending a signal to the receiver end C123 by the transmitter end C121, the current states of channel A102 and channel C122 need to be calibrated, including the current channel loss performances of these channels at the frequency of the input signal, so that it is possible to accurately and reliably determine how to perform channel loss compensation and how to amplify or attenuate the signal to adapt to the needs of the subsequent module. Drawings and detailed embodiments of the present disclosure will be referenced to for further description below, showing that how an on-chip virtual network analyzer, method, computer device, and storage medium, as provided by the present disclosure, achieves these beneficial effects.

FIG. 2 is a schematic diagram illustrating an example on-chip virtual network analyzer according to some embodiments. As shown in FIG. 2, a transmitter end D201, by means of a first channel D202, sends signals to a receiver end D203. An on-chip virtual network analyzer (On-chip VNA) 200 is deployed at the receiver end D203. The on-chip virtual network analyzer 200 includes: an equalizer (EQ) 210, deployed at a receiver end D203 of a first channel D202, configured for modulating an intermediate signal according to an adjustable equalization gain so as to obtain an output signal, the intermediate signal being obtained by the transmission of an input signal through the first channel D202; a peak detector (PD)212, deployed at the receiver end D203, configured for detecting a waveform peak of the output signal. The on-chip virtual network analyzer 200 is configured for establishing a loss model of the first channel D202 in a training mode. The loss model of the first channel D202 indicates losses of a plurality of signals of different frequencies with a fixed amplitude transmitted through the first channel respectively, and, the equalizer 210 in the training mode does not modulate. The on-chip virtual network analyzer 200 is configured for, in an operating mode, in accordance with the loss model of the first channel D202, based on a frequency of the input signal and the waveform peak of the output signal detected by the peak detector 212, adjusting the adjustable equalization gain, such that an amplitude of the output signal is consistent with an amplitude of the input signal.

Referring to FIG. 2, the on-chip virtual network analyzer 200 is deployed at the receiver end D203. The on-chip virtual network analyzer 200 and the receiver end D203 may correspond to implementations such as data centers, high performance computers, and high speed digital communications, like data transmission from one node to another node or from one machine to another machine, or like the signal amplifying or signal attenuation between pre-stage circuits and post-stage circuits related to analog-to-digital conversion and digital-to-analog conversion. One end of the first channel D202 is the receiver end D203, and the other end is the corresponding transmitter end. In practical applications, the first channel D202 is generally fixed after the installation of the entire data transmission system, such as a connecting cable that connects between two servers. During the use of the first channel D202, affected by the aging and device loss, the channel loss performance of the first channel D202 for the signal transmitted through the first channel D202 may deviate from the situation of initial installation. In addition, in multi-channel application scenarios, the first channel D202 can be regarded as any channel or a representative channel of the multi-channel. Since each channel differs in its respective channel loss performance due to the aging and device loss of its own during its use, therefore, it is difficult to cope with the current state of each channel if the channel compensation is set according to the situation at the time of installation of the multi-channel. However, since individual channels are generally fixed after the installation of the system, it is difficult to disassemble them for direct inspection. In addition, there may be large differences in channel loss performance between different channels, for example, signals of the same amplitude of the same frequency may have different degrees of loss after transmission through two different channels, and as mentioned above, different channels may have differences in channel loss performance due to the influence of their respective aging and device loss during usage. Therefore, the current states of multiple channels need to be calibrated, including the current channel loss performance of these channels at the frequency point of the input signal, such that it is possible to accurately and reliably determine how to perform channel loss compensation and how to amplify or attenuate the signal to meet the requirements of the subsequent module 220.

Still referring to FIG. 2, the on-chip virtual network analyzer 200 includes the equalizer 210. The equalizer 210 is deployed at the receiver end D203 of the first channel D202. The equalizer 210 is configured for modulating an intermediate signal according to an adjustable equalization gain so as to obtain an output signal. The intermediate signal is obtained by the transmission of an input signal through the first channel D202. The on-chip virtual network analyzer 200 also includes the peak detector 212. The peak detector 212 is deployed at the receiver end D203. The peak detector 212 is configured for detecting a waveform peak of the output signal. The on-chip virtual network analyzer 200 uses the cooperation between its equalizer 210 and peak detector 212, and runs in the training mode or in the operating mode. Specifically, the on-chip virtual network analyzer 200 is configured for establishing a loss model of the first channel D202 in a training mode. The loss model of the first channel D202 indicates losses of a plurality of signals of different frequencies with a fixed amplitude transmitted through the first channel D202 respectively, and, the equalizer 210 in the training mode does not modulate. The on-chip virtual network analyzer 200 is also configured for, in an operating mode, in accordance with the loss model of the first channel D202, based on a frequency of the input signal and the waveform peak of the output signal detected by the peak detector 212, adjusting the adjustable equalization gain, such that an amplitude of the output signal is consistent with an amplitude of the input signal. Accordingly, the on-chip virtual network analyzer 200 uses the equalizer 210 and the peak detector 212 to form a closed-loop system with negative feedbacks, and this closed-loop system, as the on-chip virtual network analyzer 200 is in the operating mode, based on the waveform peak of the output signal detected by the peak detector 212, may determine the amplitude of the output signal, and therefore adjust the adjustable equalization gain, so as to make the amplitude of the output signal consistent with the amplitude of the input signal. Further, with respect to the above-mentioned problem of the channel loss performance of the first channel D202 deviating during usage, the on-chip virtual network analyzer 200 establishes the loss model of the first channel D202 in the training mode, and the loss model of the first channel D202 indicates losses of a plurality of signals of different frequencies with a fixed amplitude transmitted through the first channel respectively. For example, in the training mode, a plurality of signals of different frequencies with a fixed amplitude are transmitted through the first channel D202 to the receiver end D203, and because the equalizer 210 in the training mode does not modulate, this means that the waveform peak of the output signal detected by the peak detector 212 in the training mode, may be used to detect the current state of the first channel D202 and the channel loss performance at different frequency points. For example, a plurality of signals of different frequencies with a fixed amplitude, such as three signals of 1 GHz, 5 GHz, and 20 GHz, may be transmitted through the first channel D202 to the receiver end D203, and then, the equalizer 202 in the training mode does not modulate. In other words, the adjustable equalization gain provided by the equalizer 202 in the training mode is fixed to 1.0, therefore, in the training mode, the equalizer 202 and the peak detector 212 together does not provide negative feedback control, while in contrast, the equalizer 202 provides a gain fixed to 1.0 and the peak detector 212 detects the amplitude of the output signal. Accordingly, in the training mode, the on-chip virtual network analyzer 200 uses the equalizer 210 and the peak detector 212 in a way that negative feedback control is not provided, but rather a scanning mechanism that uses the frequency of the input signal as a variable is provided, so as to determine how the input signal of different frequencies with a fixed amplitude is attenuated after transmission through the first channel D202, i.e., the channel loss performance of the first channel D202 with respect to the input signal of different frequencies with a fixed amplitude. For example, three signals of 1 GHz, 5 GHz, and 20 GHz with a fixed amplitude, may be transmitted through the first channel D202 to the receiver end D203, and the on-chip virtual network analyzer 200 in the training mode by way of the scanning mechanism detects that the amplitude of the output signal is 1 volt (corresponding to 1 GHz), 0.8 volts (corresponding to 5 GHz), and 0.2 volts (corresponding to 20 GHz). As such, in the training mode, the on-chip virtual network analyzer 200 uses the equalizer 210 and the peak detector 212 to provide the scanning mechanism, while the equalizer 210 does not modulate and therefore does not perform compensation and gain control, and detects the signal attenuation situation of the input signal of different frequencies to transmit through the first channel D202 and then received by the receiver end D203, this not only indicates the channel loss performance brought by the first channel D202, but also takes into account the impact caused by the devices and circuitry of the equalizer 210 itself. The scan results can be depicted as a curve, with the horizontal axis being the different frequencies of the input signal and the vertical axis being the amplitude of the output signal detected by the corresponding peak detector 212. For example, in the curve of the scan result, with respect to three signals of 1 GHz, 5 GHz, and 20 GHz with a fixed amplitude, there may exist three scan results, that respectively are (1 GHz, 1 volt), (5 GHz, 0.8 volts), and (20 GHz, 0.2 volts). Here, the scan result of (1 GHz, 1 volts) means that at the frequency point of 1 GHz, for the input signal with the fixed amplitude, the amplitude of the corresponding output signal is 1 volt. The scan result of (5 GHz, 0.8 volts) means that at the frequency point of 5 GHz, for the input signal with the fixed amplitude, the amplitude of the corresponding output signal is 0.8 volts. The scan result of (20 GHz, 0.2 volts) means that at the frequency point of 20 GHz, for the input signal with the fixed amplitude, the amplitude of the corresponding output signal is 0.2 volts. Accordingly, the S21 parameters, i.e., the gain-to-bandwidth curve, can be measured, and the amplitude of the output signal relative to the amplitude of the input signal can be represented by the vertical axis, i.e., the Y-axis, and the operating frequency range can be represented by the horizontal axis, i.e., the X-axis. In addition, the input signal can be an electrical signal that is to be transmitted through the first channel D202, such as a differential voltage signal, or can be an optical signal that is to be transmitted through the first channel D202. Therefore, in optoelectronic application scenarios, the photoelectric S21 parameter, that is, the relative ratio of the optical modulation output power to the input electrical power, can be detected, which is used to represent the relative modulation efficiency roll-off compared to the direct-current or low-frequency electro-optical response. Therefore, the on-chip virtual network analyzer 200 shown in FIG. 2 can be used in application scenarios such as data centers, high-performance computers, and high-speed digital communications, and can be used for high-speed transmission of electrical signals and optical signals, such as data centers using optical interconnection technology.

Still referring to FIG. 2, the on-chip virtual network analyzer 200 in the training mode provides a scanning mechanism and provides scan results, and establishes the loss model of the first channel D202. Also, the loss model of the first channel D202 indicates losses of a plurality of signals of different frequencies with a fixed amplitude transmitted through the first channel D202 respectively. As such, by using the scan results obtained in the training mode and the established loss model of the first channel D202, reliable referential basis is provided for the negative feedback control provided by the on-chip virtual network analyzer 200 in the operating mode, i.e., the closed-loop system with negative feedback, thereby effectively solving the problem of the channel loss performance of the first channel D202 deviating during usage. Specifically, the on-chip virtual network analyzer 200 in the operating mode, in accordance with the loss model of the first channel D202, based on a frequency of the input signal and the waveform peak of the output signal detected by the peak detector 212, adjusts the adjustable equalization gain, such that an amplitude of the output signal is consistent with an amplitude of the input signal. Assuming the pre-stage circuit is a digital-to-analog converter (DAC), the signal output by the DAC may have an amplitude that is a reference value, such as 1 volt or 5 volts. By means of the loss model established in the training mode, one may determine losses of a plurality of signals of different frequencies with a fixed amplitude (such as 5 volts) transmitted through the first channel D202 respectively, that are output by the pre-stage circuit, this not only indicates the channel loss performance brought by the first channel D202, but also takes into account the impact caused by the devices and circuitry of the equalizer 210 itself. Accordingly, in the operating mode, it utilizes the cooperation of the equalizer 210 and the peak detector 212, and uses the loss model of the first channel D202 to determine the scanning result corresponding to the frequency of the current input signal, so as to determine the channel loss performance of the first channel D202 at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. As such, the on-chip virtual network analyzer 200 in the operating mode, in accordance with the loss model of the first channel D202, based on a frequency of the input signal and the waveform peak of the output signal detected by the peak detector 212, adjusts the adjustable equalization gain, such that an amplitude of the output signal is consistent with an amplitude of the input signal. From the perspective of S21 parameter or gain-to-bandwidth curve, the training mode is used to establish the loss model, and then the operating mode is utilized to use the established loss model, so that the amplitude of the output signal of different frequencies may be increased to obtain a relatively flat curve. Taking the three scan results in the above-mentioned scan curve as an example, which are respectively (1 GHz, 1 volt), (5 GHz, 0.8 volts), and (20 GHz, 0.2 volts), by adjusting the adjustable equalization gain so as to make the amplitude of the output signal consistent with the amplitude of the input signal, therefore, on the scan curve after the gain control so obtained, the three scan results become (1 GHz, 1 volt), (5 GHz, 1 volt), and (20 GHz, 1 volt). As such, by means of the loss model established by the on-chip virtual network analyzer 200 in the training mode and the gain control in the operating mode, at the frequency point of 1 GHz, at the frequency point of 5 GHz, and at the frequency point of 20 GHz, for the input signal provided by the pre-stage circuit such as the DAC, the amplitude of the output signal is consistent with the amplitude of the input signal, so that the amplitude of the output signal at different frequency points is maintained consistent, and this is conducive to adapting to the needs of the post-stage circuit, while realizing real-time adaptation to the current state of the first channel D202.

Still referring to FIG. 2, in multi-channel application scenarios, the first channel D202 can be regarded as any channel or a representative channel of the multi-channel. Each channel differs in its respective channel loss performance due to the aging and device loss of its own during its use. By deploying the on-chip virtual network analyzer 200 as depicted by FIG. 2 at a respective receiver end of each channel of a plurality of channels, with refence to how the on-chip virtual network analyzer 200 in the training mode establishes the loss model of the first channel D202 and uses the established loss model of the first channel D202 to perform gain control in the operating mode, a respective on-chip virtual network analyzer 200 corresponding to each channel of the plurality of channels may establish a corresponding loss model and perform gain control. As such, when the respective on-chip virtual network analyzer 200 that is deployed at the receiver end of each channel of all channels has completed training, the respective on-chip virtual network analyzer 200 corresponding to each channel may adapt to the input signal at any frequency point, and controls the adjustable equalization gain of the corresponding equalizer 210, thereby making the amplitude of the output signal consistent with the amplitude of the input signal for each channel. As long as the frequency of the input signal falls within the range of the loss model established in the training mode, in other words, as long as the frequency range covered by the loss model established in the training mode is wide enough, the gain control needs of each channel can be satisfied. Moreover, because the scanning mechanism in the training mode has taken into account the characteristics such as the different lengths and frequency sensitivity that may exist between different channels, and also has taken into account the current states of the multiple channels, including the current channel loss performances of these channels at the frequency of the input signal, therefore, the respective on-chip virtual network analyzer 200 corresponding to each channel of the plurality of channels with training completed, can ensure that the output of all channels is consistent. Accordingly, it enables accurate and reliable judgment on how to perform channel loss compensation and how to amplify or attenuate the signal to meet the needs of subsequent module 220, which is conducive to improving the overall performance of the system.

In sum, the on-chip virtual network analyzer 200 establishes the loss model of the first channel D202 in the training mode, and uses the loss model of the first channel D202 in the operating mode, based on the frequency of the input signal and the waveform peak of the output signal detected by the peak detector 212, adjusts the adjustable equalization gain, such that the amplitude of the output signal is consistent with the amplitude of the input signal. It not only takes into account the channel loss performance caused by the first channel D202, but also takes into account the influence caused by the devices and circuitry of the equalizer 210 itself. In the operating mode, it utilizes the cooperation of the equalizer 210 and the peak detector 212, and uses the loss model of the first channel D202 to determine the scanning result corresponding to the frequency of the current input signal, so as to determine the channel loss performance of the first channel D202 at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. It enables accurate and reliable judgment on how to perform channel loss compensation and how to amplify or attenuate the signal to meet the needs of subsequent module 220, which is conducive to improving the overall performance of the system.

Referring to FIG. 2, in some embodiments, the equalizer 210 in the operating mode modulates the intermediate signal according to the adjustable equalization gain after adjustment so as to obtain the output signal. Accordingly, in the operating mode, it utilizes the cooperation of the equalizer 210 and the peak detector 212, and uses the loss model of the first channel D202 to determine the scanning result corresponding to the frequency of the current input signal, so as to determine the channel loss performance of the first channel D202 at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. It enables accurate and reliable judgment on how to perform channel loss compensation and how to amplify or attenuate the signal to meet the needs of subsequent module 220, which is conducive to improving the overall performance of the system.

In some embodiments, the adjustable equalization gain in the training mode is fixed to 1.0. As such, the adjustable equalization gain provided by the equalizer 202 in the training mode is fixed to 1.0, therefore, in the training mode, the equalizer 202 and the peak detector 212 together does not provide negative feedback control, while in contrast, the equalizer 202 provides a gain fixed to 1.0 and the peak detector 212 detects the amplitude of the output signal. Accordingly, in the training mode, the on-chip virtual network analyzer 200 uses the equalizer 210 and the peak detector 212 in a way that negative feedback control is not provided, but rather a scanning mechanism that uses the frequency of the input signal as a variable is provided, so as to determine how the input signal of different frequencies with a fixed amplitude is attenuated after transmission through the first channel D202, i.e., the channel loss performance of the first channel D202 with respect to the input signal of different frequencies with a fixed amplitude. As such, by using the scan results obtained in the training mode and the established loss model of the first channel D202, reliable referential basis is provided for the negative feedback control provided by the on-chip virtual network analyzer 200 in the operating mode, i.e., the closed-loop system with negative feedback, thereby effectively solving the problem of the channel loss performance of the first channel D202 deviating during usage.

In some embodiments, the loss model of the first channel D202 indicates amplitudes of a plurality of intermediate signals obtained by the transmission of the plurality of signals of different frequencies with the same fixed amplitude through the first channel D202 respectively. As such, in the training mode, the on-chip virtual network analyzer 200 uses the equalizer 210 and the peak detector 212 to provide the scanning mechanism, while the equalizer 210 does not modulate and therefore does not perform compensation and gain control, and detects the signal attenuation situation of the input signal of different frequencies to transmit through the first channel D202 and then received by the receiver end D203, this not only indicates the channel loss performance brought by the first channel D202, but also takes into account the impact caused by the devices and circuitry of the equalizer 210 itself. As such, by using the scan results obtained in the training mode and the established loss model of the first channel D202, reliable referential basis is provided for the negative feedback control provided by the on-chip virtual network analyzer 200 in the operating mode, i.e., the closed-loop system with negative feedback, thereby effectively solving the problem of the channel loss performance of the first channel D202 deviating during usage.

In some embodiments, the peak detector in the training mode is configured for providing a frequency sweep function for determining a S21 parameter of a system including the first channel and the on-chip virtual network analyzer, the S21 parameter being a gain-to-bandwidth change curve. Accordingly, the S21 parameters, i.e., the gain-to-bandwidth curve, can be measured, and the amplitude of the output signal relative to the amplitude of the input signal can be represented by the vertical axis, i.e., the Y-axis, and the operating frequency range can be represented by the horizontal axis, i.e., the X-axis. As such, by using the scan results obtained in the training mode and the established loss model of the first channel D202, reliable referential basis is provided for the negative feedback control provided by the on-chip virtual network analyzer 200 in the operating mode, i.e., the closed-loop system with negative feedback, thereby effectively solving the problem of the channel loss performance of the first channel D202 deviating during usage.

In some embodiments, the equalizer and the peak detector in the operating mode together form a negative feedback loop for providing a swing control function. Accordingly, the on-chip virtual network analyzer 200 uses the equalizer 210 and the peak detector 212 to form a closed-loop system with negative feedbacks, and this closed-loop system, as the on-chip virtual network analyzer 200 is in the operating mode, based on the waveform peak of the output signal detected by the peak detector 212, may determine the amplitude of the output signal, and therefore adjust the adjustable equalization gain, so as to make the amplitude of the output signal consistent with the amplitude of the input signal. As such, when the closed-loop system is stable, the amplitude of the output signal maintains consistent with the amplitude of the input signal.

In some embodiments, the input signal and the output signal are both electrical signals, an on-chip oscilloscope (On-chip OSC) is deployed at the receiver end D203 for performing waveform analyzing to the output signal to obtain a waveform analysis result, and, the waveform analysis result is used for improving the performance of the on-chip virtual network analyzer. The input signal can be an electrical signal that is to be transmitted through the first channel D202, such as a differential voltage signal. By deploying an on-chip oscilloscope for performing waveform analyzing to the output signal that is an electrical signal, the waveform analysis result may be used to further improve the gain control and the negative feedback mechanism, thereby enabling accurate and reliable judgment on how to perform channel loss compensation and how to amplify or attenuate the signal to meet the needs of subsequent module 220, which is conducive to improving the overall performance of the system.

In some embodiments, the input signal and the output signal are both optical signals, a photo-diode (PD) and an on-chip oscilloscope are deployed at the receiver end, the photo-diode is used for converting the output signal into an electrical signal corresponding to the output signal, the on-chip oscilloscope is used for performing waveform analyzing to the electrical signal corresponding to the output signal to obtain a waveform analysis result, and, the waveform analysis result is used for improving the performance of the on-chip virtual network analyzer. The input signal can be an electrical signal that is to be transmitted through the first channel D202, such as a differential voltage signal, or can be an optical signal that is to be transmitted through the first channel D202. Therefore, in optoelectronic application scenarios, the photoelectric S21 parameter, that is, the relative ratio of the optical modulation output power to the input electrical power, can be detected, which is used to represent the relative modulation efficiency roll-off compared to the direct-current or low-frequency electro-optical response. Therefore, the on-chip virtual network analyzer 200 shown in FIG. 2 can be used in application scenarios such as data centers, high-performance computers, and high-speed digital communications, and can be used for high-speed transmission of electrical signals and optical signals, such as data centers using optical interconnection technology. As such, by deploying the photo-diode and the on-chip oscilloscope, and by using the photo-diode for converting the output signal into the electrical signal corresponding to the output signal, and by using the on-chip oscilloscope for performing waveform analyzing to the electrical signal corresponding to the output signal to obtain a waveform analysis result, therefore, the waveform analysis result may be used to further improve the gain control and the negative feedback mechanism, thereby enabling accurate and reliable judgment on how to perform channel loss compensation and how to amplify or attenuate the signal to meet the needs of subsequent module 220, which is conducive to improving the overall performance of the system.

In some embodiments, the first channel D202 belongs to a plurality of channels, a respective on-chip virtual network analyzer is deployed at a receiver end of each channel of the plurality of channels, the respective on-chip virtual network analyzer corresponding to each channel of the plurality of channels is configured for, in the training mode establishing a respective loss model of each channel of the plurality of channels, and, in the operating mode using the respective loss model of each channel of the plurality of channels to adjust an adjustable equalization gain of an equalizer of the respective on-chip virtual network analyzer corresponding to each channel of the plurality of channels. In multi-channel application scenarios, the first channel D202 can be regarded as any channel or a representative channel of the multi-channel. Each channel differs in its respective channel loss performance due to the aging and device loss of its own during its use. By deploying the on-chip virtual network analyzer 200 as depicted by FIG. 2 at a respective receiver end of each channel of a plurality of channels, with refence to how the on-chip virtual network analyzer 200 in the training mode establishes the loss model of the first channel D202 and uses the established loss model of the first channel D202 to perform gain control in the operating mode, a respective on-chip virtual network analyzer 200 corresponding to each channel of the plurality of channels may establish a corresponding loss model and perform gain control. As such, when the respective on-chip virtual network analyzer 200 that is deployed at the receiver end of each channel of all channels has completed training, the respective on-chip virtual network analyzer 200 corresponding to each channel may adapt to the input signal at any frequency point, and controls the adjustable equalization gain of the corresponding equalizer 210, thereby making the amplitude of the output signal consistent with the amplitude of the input signal for each channel. As long as the frequency of the input signal falls within the range of the loss model established in the training mode, in other words, as long as the frequency range covered by the loss model established in the training mode is wide enough, the gain control needs of each channel can be satisfied. Moreover, because the scanning mechanism in the training mode has taken into account the characteristics such as the different lengths and frequency sensitivity that may exist between different channels, and also has taken into account the current states of the multiple channels, including the current channel loss performances of these channels at the frequency of the input signal, therefore, the respective on-chip virtual network analyzer 200 corresponding to each channel of the plurality of channels with training completed, can ensure that the output of all channels is consistent. Accordingly, it enables accurate and reliable judgment on how to perform channel loss compensation and how to amplify or attenuate the signal to meet the needs of subsequent module 220, which is conducive to improving the overall performance of the system.

In some embodiments, the plurality of channels correspond to a plurality of connecting cables on a same panel, a respective round-trip loss of each connecting cable of the plurality of connecting cables is determined base on a respective position of each connecting cable of the connecting cables on the panel and a respective length of each connecting cable of the connecting cables. In practical applications, the first channel D202 is generally fixed after the installation of the entire data transmission system, such as a connecting cable that connects between two servers. On the same panel, depending on the length of each connecting cable of the plurality of connecting cables, in general, the length of the connecting cable at the center of the panel is shorter and has a smaller loss, while, the length of the connecting cable at the edge of the panel is longer and has a larger loss. Therefore, based on the respective positions of the plurality of connecting cables on the panel and the respective lengths of the plurality of connecting cables, there are variances in the respective round-trip losses of the plurality of connecting cables. By deploying the on-chip virtual network analyzer 200 in multi-channel application scenarios, the respective on-chip virtual network analyzer 200 corresponding to each channel of the plurality of channels with training completed, can ensure that the output of all channels is consistent. Accordingly, it enables accurate and reliable judgment on how to perform channel loss compensation and how to amplify or attenuate the signal to meet the needs of subsequent module 220, which is conducive to improving the overall performance of the system.

FIG. 3 is a flow chart illustrating a method for on-chip virtual network analyzing according to some embodiments. As depicted by FIG. 3, the method for on-chip virtual network analyzing has following steps.

Step S301: providing an equalizer of an on-chip virtual network analyzer, the equalizer being deployed at a receiver end of a first channel, the equalizer being configured for modulating an intermediate signal according to an adjustable equalization gain so as to obtain an output signal, the intermediate signal being obtained by the transmission of an input signal through the first channel.

Step S303: providing a peak detector of the on-chip virtual network analyzer, the peak detector being deployed at the receiver end, the peak detector being configured for detecting a waveform peak of the output signal.

The on-chip virtual network analyzer is configured for establishing a loss model of the first channel in a training mode, the loss model of the first channel indicates losses of a plurality of signals of different frequencies with a fixed amplitude transmitted through the first channel respectively, and, the equalizer in the training mode does not modulate. The on-chip virtual network analyzer is configured for, in an operating mode, in accordance with the loss model of the first channel, based on a frequency of the input signal and the waveform peak of the output signal detected by the peak detector, adjusting the adjustable equalization gain, such that an amplitude of the output signal is consistent with an amplitude of the input signal.

Referring to FIG. 3, in multi-channel application scenarios, the first channel can be regarded as any channel or a representative channel of the multi-channel. Each channel differs in its respective channel loss performance due to the aging and device loss of its own during its use. By deploying the on-chip virtual network analyzer as depicted by at a respective receiver end of each channel of a plurality of channels, with refence to how the on-chip virtual network analyzer in the training mode establishes the loss model of the first channel and uses the established loss model of the first channel to perform gain control in the operating mode, a respective on-chip virtual network analyzer corresponding to each channel of the plurality of channels may establish a corresponding loss model and perform gain control. As such, when the respective on-chip virtual network analyzer that is deployed at the receiver end of each channel of all channels has completed training, the respective on-chip virtual network analyzer corresponding to each channel may adapt to the input signal at any frequency point, and controls the adjustable equalization gain of the corresponding equalizer, thereby making the amplitude of the output signal consistent with the amplitude of the input signal for each channel. As long as the frequency of the input signal falls within the range of the loss model established in the training mode, in other words, as long as the frequency range covered by the loss model established in the training mode is wide enough, the gain control needs of each channel can be satisfied. Moreover, because the scanning mechanism in the training mode has taken into account the characteristics such as the different lengths and frequency sensitivity that may exist between different channels, and also has taken into account the current states of the multiple channels, including the current channel loss performances of these channels at the frequency of the input signal, therefore, the respective on-chip virtual network analyzer corresponding to each channel of the plurality of channels with training completed, can ensure that the output of all channels is consistent. Accordingly, it enables accurate and reliable judgment on how to perform channel loss compensation and how to amplify or attenuate the signal to meet the needs of subsequent module, which is conducive to improving the overall performance of the system.

In sum, referring to the method as depicted in FIG. 3, the on-chip virtual network analyzer establishes the loss model of the first channel in the training mode, and uses the loss model of the first channel in the operating mode, based on the frequency of the input signal and the waveform peak of the output signal detected by the peak detector, adjusts the adjustable equalization gain, such that the amplitude of the output signal is consistent with the amplitude of the input signal. It not only takes into account the channel loss performance caused by the first channel, but also takes into account the influence caused by the devices and circuitry of the equalizer itself. In the operating mode, it utilizes the cooperation of the equalizer and the peak detector, and uses the loss model of the first channel to determine the scanning result corresponding to the frequency of the current input signal, so as to determine the channel loss performance of the first channel at a specific frequency point corresponding to the frequency of the input signal. Therefore, combined with the difference between the amplitude of the output signal and the amplitude of the input signal, this improves the negative feedback control, determines how to adjust the adjustable equalization gain, and eventually achieves the purpose of system stability, i.e., making the amplitude of the output signal consistent with the amplitude of the input signal. It enables accurate and reliable judgment on how to perform channel loss compensation and how to amplify or attenuate the signal to meet the needs of subsequent module, which is conducive to improving the overall performance of the system.

Referring to FIG. 3, in some embodiments, the loss model of the first channel indicates amplitudes of a plurality of intermediate signals obtained by the transmission of the plurality of signals of different frequencies with the same fixed amplitude through the first channel respectively. As such, in the training mode, the on-chip virtual network analyzer uses the equalizer and the peak detector to provide the scanning mechanism, while the equalizer does not modulate and therefore does not perform compensation and gain control, and detects the signal attenuation situation of the input signal of different frequencies to transmit through the first channel and then received by the receiver end, this not only indicates the channel loss performance brought by the first channel, but also takes into account the impact caused by the devices and circuitry of the equalizer itself. As such, by using the scan results obtained in the training mode and the established loss model of the first channel, reliable referential basis is provided for the negative feedback control provided by the on-chip virtual network analyzer in the operating mode, i.e., the closed-loop system with negative feedback, thereby effectively solving the problem of the channel loss performance of the first channel deviating during usage.

In some embodiments, the peak detector in the training mode is configured for providing a frequency sweep function for determining a S21 parameter of a system including the first channel and the on-chip virtual network analyzer, the S21 parameter being a gain-to-bandwidth change curve. Accordingly, the S21 parameters, i.e., the gain-to-bandwidth curve, can be measured, and the amplitude of the output signal relative to the amplitude of the input signal can be represented by the vertical axis, i.e., the Y-axis, and the operating frequency range can be represented by the horizontal axis, i.e., the X-axis. As such, by using the scan results obtained in the training mode and the established loss model of the first channel, reliable referential basis is provided for the negative feedback control provided by the on-chip virtual network analyzer in the operating mode, i.e., the closed-loop system with negative feedback, thereby effectively solving the problem of the channel loss performance of the first channel deviating during usage.

In some embodiments, the equalizer and the peak detector in the operating mode together form a negative feedback loop for providing a swing control function. Accordingly, the on-chip virtual network analyzer uses the equalizer and the peak detector to form a closed-loop system with negative feedbacks, and this closed-loop system, as the on-chip virtual network analyzer is in the operating mode, based on the waveform peak of the output signal detected by the peak detector, may determine the amplitude of the output signal, and therefore adjust the adjustable equalization gain, so as to make the amplitude of the output signal consistent with the amplitude of the input signal. As such, when the closed-loop system is stable, the amplitude of the output signal maintains consistent with the amplitude of the input signal.

In some embodiments, the first channel belongs to a plurality of channels, a respective on-chip virtual network analyzer is deployed at a receiver end of each channel of the plurality of channels, the respective on-chip virtual network analyzer corresponding to each channel of the plurality of channels is configured for, in the training mode establishing a respective loss model of each channel of the plurality of channels, and, in the operating mode using the respective loss model of each channel of the plurality of channels to adjust an adjustable equalization gain of an equalizer of the respective on-chip virtual network analyzer corresponding to each channel of the plurality of channels. Accordingly, in multi-channel application scenarios, the first channel can be regarded as any channel or a representative channel of the multi-channel. Each channel differs in its respective channel loss performance due to the aging and device loss of its own during its use. By deploying the on-chip virtual network analyzer at a respective receiver end of each channel of a plurality of channels, with refence to how the on-chip virtual network analyzer in the training mode establishes the loss model of the first channel and uses the established loss model of the first channel to perform gain control in the operating mode, a respective on-chip virtual network analyzer corresponding to each channel of the plurality of channels may establish a corresponding loss model and perform gain control. As such, when the respective on-chip virtual network analyzer that is deployed at the receiver end of each channel of all channels has completed training, the respective on-chip virtual network analyzer corresponding to each channel may adapt to the input signal at any frequency point, and controls the adjustable equalization gain of the corresponding equalizer, thereby making the amplitude of the output signal consistent with the amplitude of the input signal for each channel. As long as the frequency of the input signal falls within the range of the loss model established in the training mode, in other words, as long as the frequency range covered by the loss model established in the training mode is wide enough, the gain control needs of each channel can be satisfied. Moreover, because the scanning mechanism in the training mode has taken into account the characteristics such as the different lengths and frequency sensitivity that may exist between different channels, and also has taken into account the current states of the multiple channels, including the current channel loss performances of these channels at the frequency of the input signal, therefore, the respective on-chip virtual network analyzer corresponding to each channel of the plurality of channels with training completed, can ensure that the output of all channels is consistent. Accordingly, it enables accurate and reliable judgment on how to perform channel loss compensation and how to amplify or attenuate the signal to meet the needs of subsequent module, which is conducive to improving the overall performance of the system.

Figure 4:
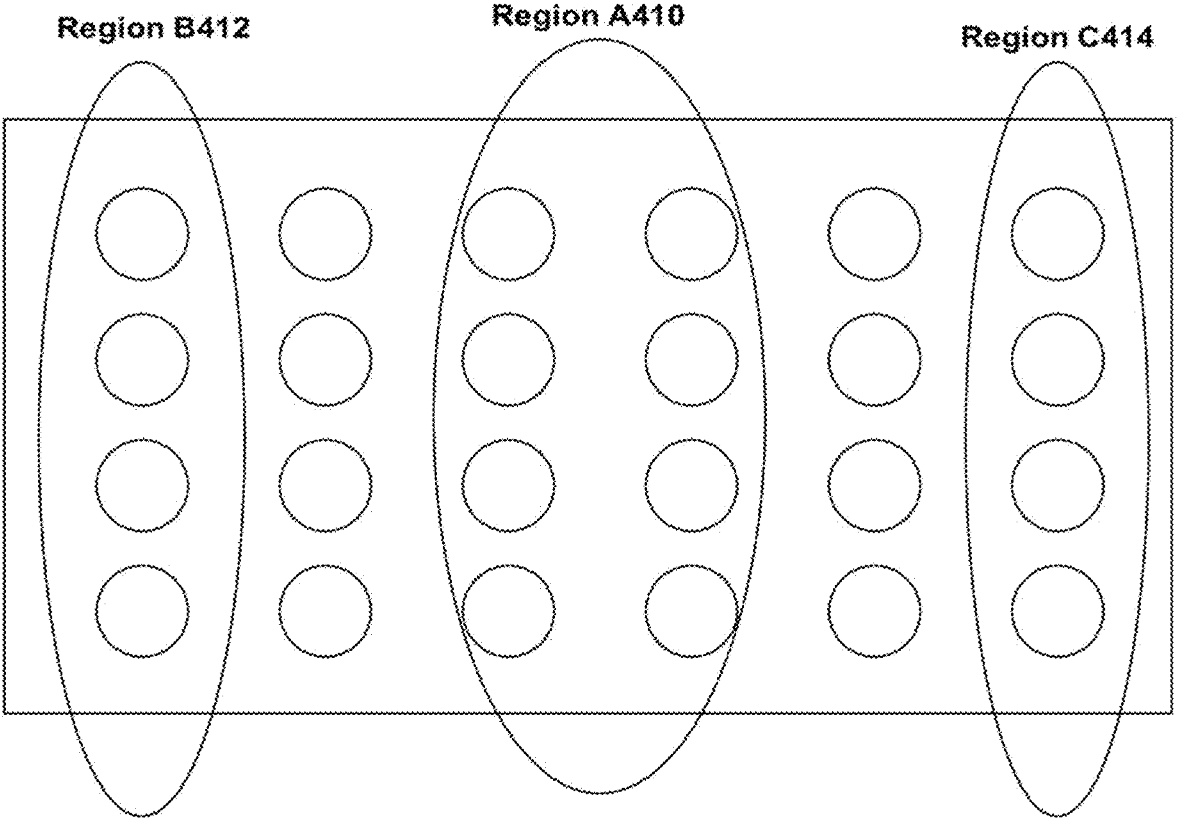
FIG. 4 is a schematic diagram illustrating a panel having a plurality of connecting cable interfaces according to some embodiments.

FIG. 4 is a schematic diagram illustrating a panel having a plurality of connecting cable interfaces according to some embodiments. As shown in FIG. 4, a panel 400 has several connecting cable interfaces, and these connecting cable interfaces are represented by circular drawings. The plurality of channels correspond to a plurality of connecting cables on a same panel, a respective round-trip loss of each connecting cable of the plurality of connecting cables is determined base on a respective position of each connecting cable of the connecting cables on the panel and a respective length of each connecting cable of the connecting cables. In practical applications, the first channel is generally fixed after the installation of the entire data transmission system, such as a connecting cable that connects between two servers. On the same panel, depending on the length of each connecting cable of the plurality of connecting cables, in general, the length of the connecting cable at the center of the panel is shorter and has a smaller loss, while, the length of the connecting cable at the edge of the panel is longer and has a larger loss. Therefore, based on the respective positions of the plurality of connecting cables on the panel and the respective lengths of the plurality of connecting cables, there are variances in the respective round-trip losses of the plurality of connecting cables. Referring to FIG. 4, the region A410 in the center of the panel 400 includes a plurality of connecting cable interfaces, and the length of the connecting cable corresponding to the connecting cable interface located in the region A410 is shorter, so the loss is smaller. The region B412 and region C414 on the edge position of the panel 400 also include a plurality of connecting cable interfaces, and the length of the connecting cable corresponding to the connecting cable interface located in the region B412 and region C414 is longer, so the loss is also larger. Therefore, in the multi-channel application scenario of panel 400 as an example, it is necessary to consider the influence of the length of the connecting cable corresponding to the connecting cable interface in different regions. For example, the length of the connecting cable corresponding to the connecting cable interface in region A410 is generally shorter than the length of the connecting cable corresponding to the connecting cable interface in region B412. By deploying the on-chip virtual network analyzer in multi-channel application scenarios, the respective on-chip virtual network analyzer corresponding to each channel of the plurality of channels with training completed, can ensure that the output of all channels is consistent. Accordingly, it enables accurate and reliable judgment on how to perform channel loss compensation and how to amplify or attenuate the signal to meet the needs of subsequent module, which is conducive to improving the overall performance of the system.

Figure 5:
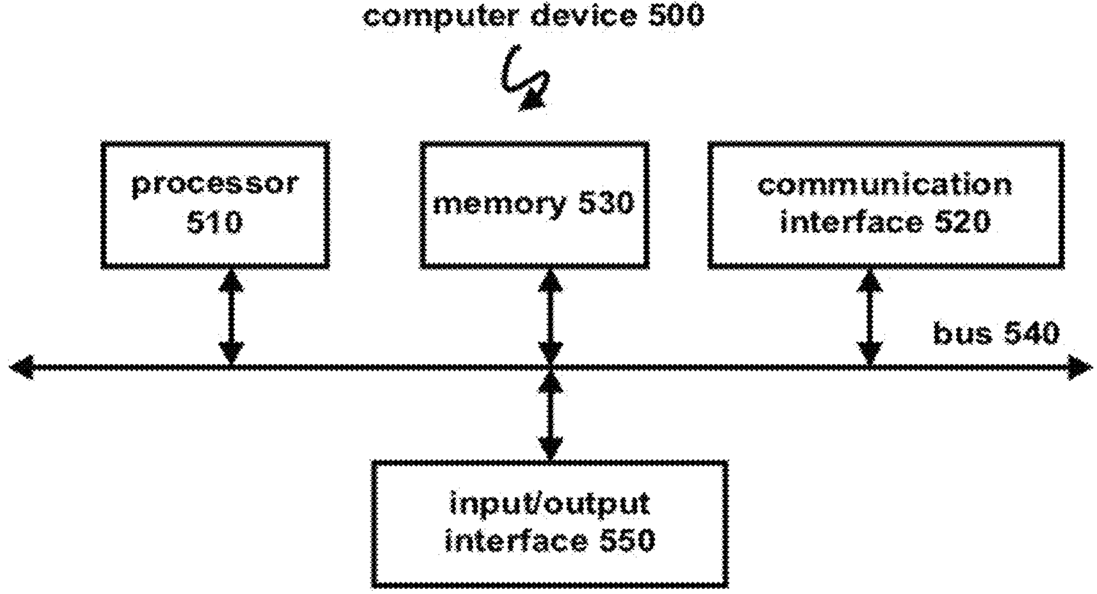
FIG. 5 is a structural schematic diagram illustrating a computer device according to some embodiments.

FIG. 5 is a structural schematic diagram illustrating a computer device according to some embodiments. The computer device 500 includes: one or more processors 510, a communication interface 520, and a memory 530. The processor 510, the communication interface 520, and the memory 530 are connected to each other through a bus 540. Optionally, the computer device 500 may also include an input/output interface 550, and the input/output interface 550 is connected with an input/output device for receiving parameters set by the user. The computer device 500 can be used to realize part or all of the functions of the device embodiments or the system embodiments in the detailed embodiments of the present disclosure. The processor 510 can also be used to realize part or all of the operation steps of the method embodiments in the detailed embodiment of the present disclosure. For example, the specific implementation of the computer device 500 to perform various operations may refer to the specific details in the preceding embodiments, such as the processor 510 is used for performing some or all of the steps in the preceding method embodiments or some or all of the operations in the preceding method embodiments. For another example, in the embodiments of the present disclosure, the computer device 500 may be used to realize part or all of the functions of one or more parts in the device embodiments. In addition, the communication interface 520 may be specifically used for the communication functions necessary to realize the functions of the devices and components, and the processor 510 may be specifically used for the processing functions necessary to realize the functions of the devices and components.

It should be understood that the computer device 500 of FIG. 5 may include one or more processors 510, and a plurality of processors 510 can provide processing capability in accordance with a parallel connection mode, a serial connection pattern, a serial parallel connection mode or any connection mode, or a plurality of processors 510 can form a processor sequence or a processor array, or a plurality of processors 510 can be divided into a main processor and an auxiliary processor. Alternatively, multiple processors 510 can have different architectures, such as heterogeneous computing architectures. In addition, the structural and functional descriptions of the computer device 500 shown in FIG. 5 are exemplary and non-restrictive. In some exemplary embodiments, the computer device 500 may include more or fewer parts than those shown in FIG. 5, or combine certain parts, or split certain parts, or have different parts arranged.

The processor 510 can be implemented in a variety of specific forms, for example, the processor 510 can include a central processing unit (CPU), a graphic processing unit (GPU), a neural network processor (NPU), a tensor processing unit, TPU) or data processing unit (DPU) and other combinations. The embodiments of the present disclosure are not specifically limited. The processor 510 can also be a single-core processor or a multi-core processor. Processor 510 can consist of a combination of CPU and hardware chips. The above-mentioned hardware chips can be application-specific integrated circuits (ASICs), programmable logic devices (PLDs), or a combination thereof. These PLDs can be complex programmable logic devices (CPLDs), field-programmable gate arrays (FPGAs), generic array logic (GALs), or any combination thereof. The processor 510 can also be implemented separately with logic devices with built-in processing logic, such as FPGAs or digital signal processors (DSPs). The communication interface 520 can be a wired interface or a wireless interface for communicating with other modules or devices, and the wired interface can be an ethernet interface, a local interconnect network, LIN, etc., and a wireless interface can be a cellular network interface or a wireless LAN interface.

Memory 530 can be non-volatile memory, e.g., read-only memory (ROM), programmable ROM (PROM), erasable PROM (EPROM), electrically erasable EPROM (EEPROM), or flash memory. Memory 530 can also be volatile memory, which can be random access memory (RAM), which is used as an external cache. By illustrative but not restrictive descriptions, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and Direct Rambus RAM (DR RAM). The memory 530 can also be used to store program codes and data, so that the processor 510 can invoke the program code stored in the memory 530 to perform some or all of the operation steps in the method embodiment, or to perform the corresponding functions in the device embodiment. In addition, the computer device 500 may contain more or fewer components than shown in FIG. 5, or may be configured differently.

Bus 540 can be a peripheral component interconnect express (PCIe) bus, or an extended industry standard architecture (EISA) bus, a unified bus (Ubus or UB), or a computer quick link (compute). express link (CXL), cache coherent interconnect for accelerators (CCIX), etc. Bus 540 can be divided into address bus, data bus, control bus, etc. Bus 540 includes not only data bus, but also power bus, control bus and status signal bus. However, for the sake of clarity, only a thick line is used in FIG. 5, but it does not mean that there is only one bus or one type of bus.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The detailed embodiments provided in the present disclosure can be implemented by any one or a combination of hardware, software, firmware, or solid-state logic circuits, and can be implemented in combination with signal processing, control, and/or dedicated circuits. The equipment(s) or device(s) provided in the detailed embodiments of the present disclosure may include one or more processors (a microprocessor, a controller, a digital signal processor (DSP), an application specific integrated circuit (ASIC), a field programmable gate array(FPGA) and so on), and these processors process various computer-executable instructions to control the operations of the equipment(s) or device(s). The equipment(s) or device(s) provided in the detailed embodiments of the present disclosure may include a system bus or a data transmission system that couples various components together. The system bus may include any one of different bus structures or a combination of different bus structures, such as a memory bus or a memory controller, a peripheral bus, a universal serial bus, and/or a process or a local bus using any of a variety of bus architectures. The equipment(s) or device(s) provided in the detailed embodiments of the present disclosure may be provided separately, may also be a part of the system, or may be a part of other equipment or devices.

The detailed embodiments provided by the present disclosure may include a computer-readable storage medium or a combination with a computer-readable storage medium, such as one or more storage devices capable of providing non-transitory data storage. The computer-readable storage medium/storage device may be configured to store data, programmers and/or instructions, which when executed by the processor of the equipment(s) or device(s) provided in the present disclosure, would allow the equipment(s) or device(s) to implement related operations. The computer-readable storage medium/storage device may include one or more of the following characteristics: volatile, nonvolatile, dynamic, static, read/write, read-only, random access, sequential access, location addressability, file addressability and content addressability. In one or more exemplary embodiments, the computer-readable storage medium/storage device may be integrated into the equipment(s) or device(s) provided in the detailed embodiments of the present disclosure or belong to a public system. The computer-readable storage media/storage devices can include optical storage devices, semiconductor storage devices and/or magnetic storage devices, etc., and can also include random access memory (RAM), flash memory, read-only memory (ROM), erasable and programmable read-only memory (EPROM), electrically erasable programmable read-only memory (EEPROM), registers, hard disk, removable disk, recordable and/or rewritable compact disc (CD), digital versatile disc (DVD), large capacity storage medium device or any other form of suitable storage medium.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An on-chip virtual network analyzer, comprising:

an equalizer, deployed at a receiver end of a first channel, configured for modulating an intermediate signal according to an adjustable equalization gain so as to obtain an output signal, wherein the intermediate signal is obtained by transmission of an input signal through the first channel;

a peak detector, deployed at the receiver end, configured for detecting a waveform peak of the output signal;

wherein, the on-chip virtual network analyzer is configured for establishing a loss model of the first channel in a training mode, the loss model of the first channel indicates losses of a plurality of signals of different frequencies with a fixed amplitude transmitted through the first channel respectively, and, the equalizer in the training mode does not modulate, the on-chip virtual network analyzer is configured for, in an operating mode, in accordance with the loss model of the first channel, based on a frequency of the input signal and the waveform peak of the output signal detected by the peak detector, adjusting the adjustable equalization gain, such that an amplitude of the output signal is consistent with an amplitude of the input signal, wherein the peak detector in the training mode is configured for providing a frequency sweep function for determining a S21 parameter of a system including the first channel and the on-chip virtual network analyzer, the S21 parameter being a gain-to-bandwidth change curve.

2. The on-chip virtual network analyzer of claim 1, the equalizer in the operating mode modulates the intermediate signal according to the adjustable equalization gain after adjustment so as to obtain the output signal.

3. The on-chip virtual network analyzer of claim 1, the adjustable equalization gain in the training mode is fixed to 1.0.

4. The on-chip virtual network analyzer of claim 1, the loss model of the first channel indicates amplitudes of a plurality of intermediate signals obtained by transmission of the plurality of signals of different frequencies with the same fixed amplitude through the first channel respectively.

5. The on-chip virtual network analyzer of claim 1, the equalizer and the peak detector in the operating mode together form a negative feedback loop for providing a swing control function.

6. The on-chip virtual network analyzer of claim 1, the input signal and the output signal are both electrical signals, an on-chip oscilloscope is deployed at the receiver end for performing waveform analyzing to the output signal to obtain a waveform analysis result, and, the waveform analysis result is used for improving the performance of the on-chip virtual network analyzer.

7. The on-chip virtual network analyzer of claim 1, the input signal and the output signal are both optical signals, a photo-diode and an on-chip oscilloscope are deployed at the receiver end, the photo-diode is used for converting the output signal into an electrical signal corresponding to the output signal, the on-chip oscilloscope is used for performing waveform analyzing to the electrical signal corresponding to the output signal to obtain a waveform analysis result, and, the waveform analysis result is used for improving the performance of the on-chip virtual network analyzer.

8. The on-chip virtual network analyzer of claim 1, the first channel belongs to a plurality of channels, a respective on-chip virtual network analyzer is deployed at a receiver end of each channel of the plurality of channels, the respective on-chip virtual network analyzer corresponding to each channel of the plurality of channels is configured for, in the training mode establishing a respective loss model of each channel of the plurality of channels, and, in the operating mode using the respective loss model of each channel of the plurality of channels to adjust an adjustable equalization gain of an equalizer of the respective on-chip virtual network analyzer corresponding to each channel of the plurality of channels.

9. The on-chip virtual network analyzer of claim 8, the plurality of channels correspond to a plurality of connecting cables on a same panel, a respective round-trip loss of each connecting cable of the plurality of connecting cables is determined based on a respective position of each connecting cable of the connecting cables on the panel and a respective length of each connecting cable of the plurality of connecting cables.

10. A method for on-chip virtual network analyzing, comprising:

providing an equalizer of an on-chip virtual network analyzer, wherein, the equalizer is deployed at a receiver end of a first channel, the equalizer is configured for modulating an intermediate signal according to an adjustable equalization gain so as to obtain an output signal, the intermediate signal is obtained by transmission of an input signal through the first channel;

providing a peak detector of the on-chip virtual network analyzer, wherein, the peak detector is deployed at the receiver end, the peak detector is configured for detecting a waveform peak of the output signal;

wherein, the on-chip virtual network analyzer is configured for establishing a loss model of the first channel in a training mode, the loss model of the first channel indicates losses of a plurality of signals of different frequencies with a fixed amplitude transmitted through the first channel respectively, and, the equalizer in the training mode does not modulate, the on-chip virtual network analyzer is configured for, in an operating mode, in accordance with the loss model of the first channel, based on a frequency of the input signal and the waveform peak of the output signal detected by the peak detector, adjusting the adjustable equalization gain, such that an amplitude of the output signal is consistent with an amplitude of the input signal, wherein the peak detector in the training mode is configured for providing a frequency sweep function for determining a S21 parameter of a system including the first channel and the on-chip virtual network analyzer, the S21 parameter being a gain-to-bandwidth change curve.

11. The method of claim 10, the loss model of the first channel indicates amplitudes of a plurality of intermediate signals obtained by transmission of the plurality of signals of different frequencies with the same fixed amplitude through the first channel respectively.

12. The method of claim 10, the equalizer and the peak detector in the operating mode together form a negative feedback loop for providing a swing control function.

13. The method of claim 10, the first channel belongs to a plurality of channels, a respective on-chip virtual network analyzer is deployed at a receiver end of each channel of the plurality of channels, the respective on-chip virtual network analyzer corresponding to each channel of the plurality of channels is configured for, in the training mode establishing a respective loss model of each channel of the plurality of channels, and, in the operating mode using the respective loss model of each channel of the plurality of channels to adjust an adjustable equalization gain of an equalizer of the respective on-chip virtual network analyzer corresponding to each channel of the plurality of channels.

14. The method of claim 13, the plurality of channels correspond to a plurality of connecting cables on a same panel, a respective round-trip loss of each connecting cable of the plurality of connecting cables is determined based on a respective position of each connecting cable of the connecting cables on the panel and a respective length of each connecting cable of the plurality of connecting cables.

15. The method of claim 10, the equalizer in the operating mode modulates the intermediate signal according to the adjustable equalization gain after adjustment so as to obtain the output signal.

16. The method of claim 10, the input signal and the output signal are both electrical signals, an on-chip oscilloscope is deployed at the receiver end for performing waveform analyzing to the output signal to obtain a waveform analysis result, and, the waveform analysis result is used for improving the performance of the on-chip virtual network analyzer.

17. The method of claim 10, the input signal and the output signal are both optical signals, a photo-diode and an on-chip oscilloscope are deployed at the receiver end, the photo-diode is used for converting the output signal into an electrical signal corresponding to the output signal, the on-chip oscilloscope is used for performing waveform analyzing to the electrical signal corresponding to the output signal to obtain a waveform analysis result, and, the waveform analysis result is used for improving the performance of the on-chip virtual network analyzer.

* * * * *